(12) United States Patent
Xi

(10) Patent No.: US 6,674,257 B2
(45) Date of Patent: Jan. 6, 2004

(54) CURRENT LIMITING CIRCUIT OF BRUSHLESS DC FAN MOTOR

(75) Inventor: Junnan Xi, Miyota-machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/178,509

(22) Filed: Jun. 25, 2002

(65) Prior Publication Data

US 2003/0001531 A1 Jan. 2, 2003

(30) Foreign Application Priority Data

Jun. 25, 2001 (JP) .......................................... 2001-191384

(51) Int. Cl.[7] .................................................. H02P 6/08
(52) U.S. Cl. ........................ 318/254; 318/138; 318/439; 318/434; 323/282
(58) Field of Search ................................ 318/434, 138, 318/439, 254; 323/282

(56) References Cited

U.S. PATENT DOCUMENTS 5,721,474 A * 2/1998 Lee et al. .................... 318/434
6,274,991 B1 * 8/2001 Busch ......................... 318/254
6,285,146 B1 * 9/2001 Harlan ........................ 318/254

* cited by examiner

Primary Examiner—Rita Leykin
(74) Attorney, Agent, or Firm—Oliff & Berridge PLC

(57) ABSTRACT

There is provided a current limiting circuit to eliminate any harsh grating noise attributable to the decrease in an ON-OFF frequency of an electrified current from a normal range, for example, below 1 kHz when starting a brushless DC fan motor. In the current limiting circuit to limit the current by shutting off field coils to be electrified for a period in which the control voltage exceeds the reference voltage by the output signal of a comparator in which a current-detecting resistor is interposed in electrified passages of the field coils of the brushless DC fan motor to compare the voltage according to the voltage produced across the current-detecting resistor as the control voltage with the reference voltage according to the current to be limited when the motor is started or the like, a differential amplifier is interposed between the current-detecting resistor and the comparator to improve the comparative accuracy between the control voltage with the reference voltage in the comparator so that the accuracy is not easily affected by malfunction factors.

2 Claims, 4 Drawing Sheets

CURRENT LIMITING CIRCUIT OF BRUSHLESS DC FAN MOTOR

BACKGROUND OF THE INVENTION

1. Field of the Invention

The present invention relates to a brushless DC fan motor suitable for a fan radiating heat from a housing of an OA appliance, and more particularly to a current limiting circuit thereof.

2. Description of the Related Art

In an electronic appliance such as OA appliances including personal computers and copiers, a large number of electronic components are accommodated in a small housing, whereby heat is generated from the electronic components and accumulated in the housing so as to have a possibility to damage the electronic components.

To solve this problem, a ventilation hole is provided in a wall or a ceiling of the housing, and a fan motor is mounted in the ventilation hole so as to radiate heat outside of the housing.

In the fan motor of the above, a noise occurs when the fan motor is started (hereinafter referred to as a "starting noise"), and the starting noise will be maximum when relatively large fan motor is provided, causing the harsh grating noise.

When the brushless DC fan motor is used for the fan motor, the staring noise becomes prominent especially when the ON-OFF frequency of the starting current is less than 1 kHz.

The brushless DC fan motor is not exceptional among other motors so that a current limiting circuit is provided as a countermeasure in order to prevent the excess current from being occurred when the fan motor is started or in an overload condition.

Although the current limiting circuit is employed in such a manner as to shut off field coils to be electrified to suppress the excess current, such a ON-OFF frequency of the starting current largely depend on the configuration of the current limiting circuit.

FIG. 3 shows the current limiting circuit of a conventional brushless DC fan motor.

In the figure, numeral 31 denotes current limiting circuit of a brushless DC fan motor (circuit) 32. Here shows the current limiting circuit 31 in the two-phase motor 32.

As shown in the figure, the brushless DC fan motor 32 comprises field coils L1 and L2, FETs T1 and T2, and a drive circuit DRV. The field coils L1 and L2 are mounted on a stator (not shown), and conducted by the FETs T1 and T2 in an alternately switching manner to form the rotating magnetic field. A rotor (not shown) rotates by means of the rotation of a permanent magnet provided thereon following the above rotating magnetic field.

The current limiting circuit 31 comprises resistors R0 to R3, capacitors C1 and C2, a comparator COM, a PNP transistor Q1, an NPN transistor Q2 and diodes D1 and D2.

The resistor R0, which is a current-detecting resistor connected in series to the field coils L1 and L2 so as to detect the current in the field coils L1 and L2, detects the current by converting into a voltage VA produced across the resistor.

The comparator COM compares a control voltage VB from the current-detecting resistor R0 side with a reference voltage Vf and outputs a L (Low) level signal when the control voltage VB exceeds the reference voltage Vf. The reference voltage Vf is the voltage corresponding to an allowable maximum value If of the preset starting current.

When an output signal VC' of the comparator COM is on the L level, the transistors Q1 and Q2 are turned on, and the diodes D1 and D2 are forward-biased to realize the conduction.

As a result, each gate G of the FETs T1 and T2 is grounded via the diodes D1 and D2 and the transistor Q2, and thus, the FETs T1 and T2 are turned off irrespective of the state of the control signal from the drive circuit DRV and shut off the field coils L1 and L2 to be electrified. This means that the current is limited when the current in the field coils L1 and L2 exceeds the allowable maximum value If of the starting current.

The OFF state of the FETs T1 and T2 is continued so long as the control voltage VB exceeds the reference voltage Vf and limits the starting current. When the control voltage VB is less than the reference voltage Vf, the output signal VC' of the comparator COM is on the H (High) level, the transistors Q1 and Q2 are turned off, and the diodes D1 and D2 are reverse-biased to realize the non-conduction. As a result, each gate G of the FETs T1 and T2 is released from the grounded state, and the FETs T1 and T2 are controlled by the signal from the drive circuit DRV. This means that the rotation is returned to normal one.

However, in the above conventional technology, the ON-OFF frequency of the starting current is less than 1 kHz when the motor is started, and a problem regarding the harsh grating noise of the starting noise remains.

This problem will be described below. In FIG. 4, a waveform (I) shows a normal waveform of the electrified current of the field coils L1 and L2 in the brushless DC fan motor 32. However, this waveform (I) is the synthesized current waveform of the field coils L1 and L2, in other words, the waveform of the electrified current in the current-detecting resistor R0. The ON-OFF frequency of the starting current shown in the waveform (I) in FIG. 4 is not less than 1 kHz.

In such a waveform (I) of the electrified current, the waveform of the output signal VC of the comparator COM (the voltage waveform of the anode of the diodes D1 and D2) is shown in (VC) in FIG. 4 if the current limiting circuit 31 works normally where the level If is the allowable maximum level of the predetermined current, i.e., the starting current. This means that the frequency of the output signal VC of the comparator COM (the inverting frequency on the L and H levels) is maintained to be at least 1 kHz, and the starting noise does not form any harsh grating noise.

However, in the conventional technology, the reference voltage Vf is set to be a small value. This is because the current-detecting resistor R0 cannot be increased over a predetermined value, and as a result, the voltage VA detectable by the resistor R0 cannot be increased either for the reason that the magnitude of the electrified current to the field coils L1 and L2 is not limited.

As a result, both the control voltage VB and the reference voltage Vf for the comparator COM are decreased, and the comparison of high accuracy cannot be realized in the comparator COM. Thus, the comparator is easily affected by various kinds of operation disturbance factors such as the change in temperature, the change in source voltage and the noises from the inside and outside of the current limiting circuit 31, and the waveform of the output signal VC of the comparator COM actually becomes what is shown in (VC') in FIG. 4.

This means that the H-level portion in the waveform shown in (VC) in FIG. 4 becomes a randomly-chipped waveform, which means that the ON-OFF frequency of the starting current is decreased, i.e., less than 1 kHz, causing the starting noise.

Similar phenomena occur when the motor is forcibly stopped by the external force or the like, and the improvement of these problems has been requested.

SUMMARY OF THE INVENTION

Accordingly, the present invention has been made in light of the above problems, and an object of the present invention is to provide a current limit circuit of a brushless DC fan motor to eliminate the harsh grating noise attributable to the reduction of the current ON-OFF frequency from a normal range, for example, below 1 kHz when the motor is started, or forcibly stopped by the external force.

In order to solve the above problem, there is provided a current limiting circuit in a first aspect of the present invention which limits the current in field coils of a brushless DC fan motor comprising a stator having a plurality of the field coils and a rotor having a permanent magnet in which the rotor is rotated by alternately switching the current in the field coils and rotating the permanent magnet following the rotating magnetic field formed by the field coils by shutting off the field coils to be electrified for a period in which the control voltage exceeds the reference voltage by the output signal of a comparator which compares the control voltage as the voltage according to the voltage produced across a current-detecting resistor interposed in electrified passages of the field coils with the preset reference voltage, and comprises a differential amplifier which is interposed between the current-detecting resistor and the comparator, amplifies the voltage produced across the current-detecting resistor and applies the voltage to the comparator as the control voltage.

There is provided a current limiting circuit in a second aspect of the present invention which limits the current in field coils of a brushless DC fan motor comprising a stator having a plurality of the field coils with each switching element connected in series thereto and a rotor having a permanent magnet in which the rotor is rotated by alternately switching the current in the field coils by turning ON/turning OFF the switching elements and rotating the permanent magnet following the rotating magnetic field formed by the field coils by shutting off the field coils to be electrified for a period in which the control voltage exceeds the reference voltage by the output signal of a comparator which compares the control voltage as the voltage according to the voltage produced across a current-detecting resistor interposed in electrified passages of the field coils with the preset reference voltage, and comprises a differential amplifier which is interposed between the current-detecting resistor and the comparator, amplifies the voltage produced across the current-detecting resistor and applies the voltage to the comparator as the control voltage, and switch elements which are provided corresponding to each of the switching elements, receive the output signal of the comparator and shut off the field coils to be electrified with a control input terminal of the switching elements connected in series to the field coils on the supply side of the current to produce the control voltage exceeding the reference voltage for a period in which the control voltage exceeds the reference voltage.

DESCRIPTION OF THE PREFERRED EMBODIMENTS

The embodiment of the present invention will be described below.

Figure 1:
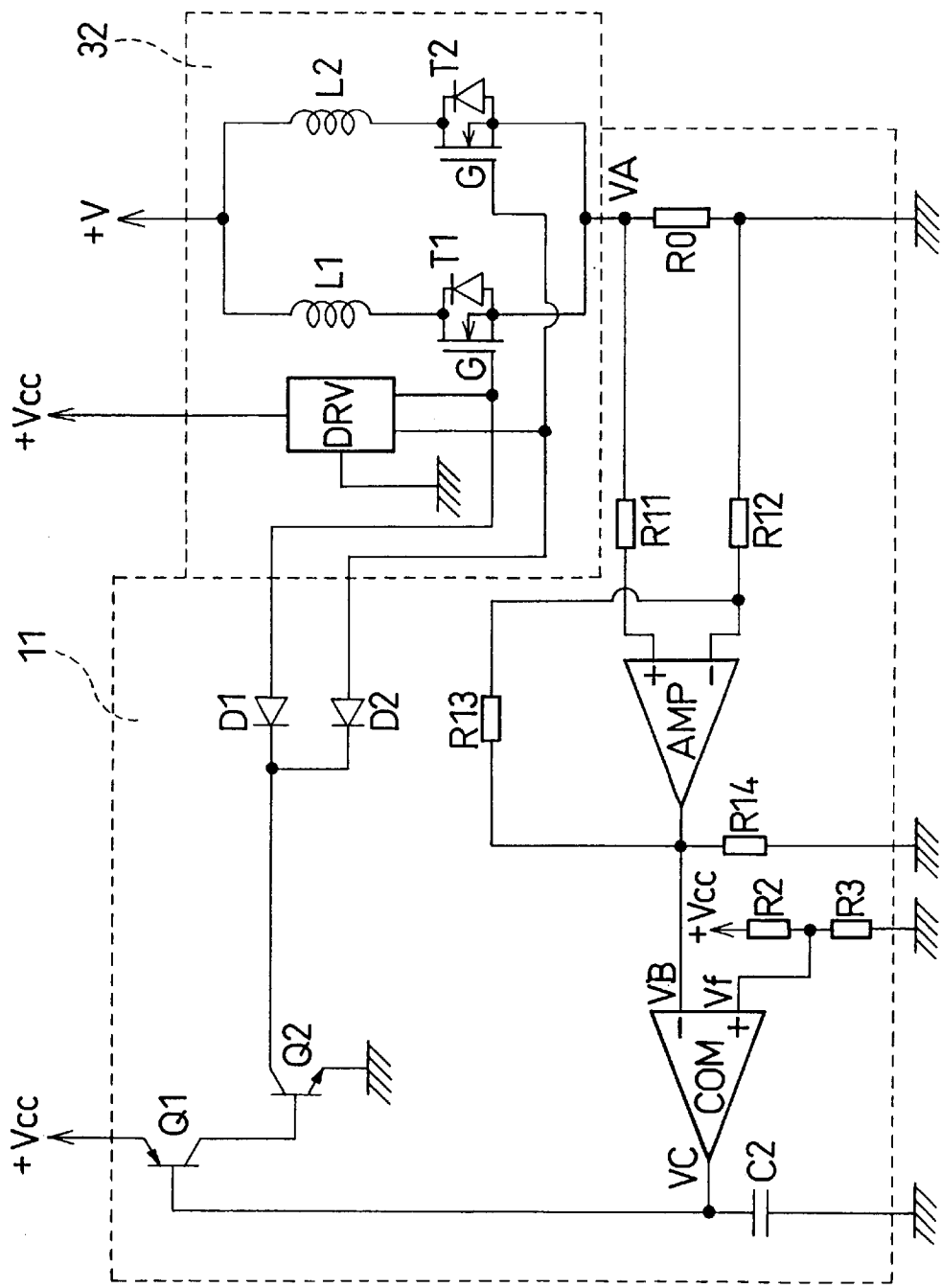
FIG. 1 shows a current limiting circuit diagram according to a first embodiment of the present invention.

FIG. 1 shows a current limiting circuit diagram of a brushless DC fan motor according to a first embodiment of the present invention.

In the figure, numeral 11 denotes a current limiting circuit of a brushless DC fan motor (circuit) 32. Here shows the current limiting circuit 11 in the two-phase motor 32.

As shown in the figure, the brushless DC fan motor 32 comprises field coils L1 and L2, switching elements respectively connected in series to the field coils L1 and L2, i.e., FETs T1 and T2, and a drive circuit DRV. The field coils L1 and L2 are mounted on a stator (not shown) and electrified in an alternately switching manner by the FETs T1 and T2 to form the rotating magnetic field.

A rotor (not shown) is rotated by making a permanent magnet provided thereon rotated following the above rotating magnetic field. The drive circuit DRV gives the ON signal (H level) to gates (control input terminals) G of the FETs T1 and T2 according to the position of rotation of the rotor, and alternately turns ON/turns OFF the FETs T1 and T2.

The current limiting circuit 11 comprises resistors R0, R2, R3 and R11 to R14, a differential amplifier AMP, a converter COM, a capacitor C2, a PNP transistor Q1, an NPN transistor Q2 and diodes D1 and D2.

The resistor R0 is a current-detecting resistor which is connected in series to the field coils L1 and L2 to detect the current in the field coils L1 and L2 and detects the current in the coils L1 and L2 by converting the current into the voltage VA produced therebetween. The capacitor C2 is used for removing the noise, The differential amplifier AMP comprises an operational amplifier, and the voltage VA produced across the current-detecting resistor R0 is applied between a non-inverting input terminal + and an inverting input terminal − via the resistors R11 and R12. The non-inverting input terminal + is located on the brushless DC fan motor 32 side, and the inverting input terminal − is located on the ground side.

This means that the differential amplifier AMP amplifies the voltage VA produced across the current-detecting resistor R0 to allow a large set value of the reference voltage Vf which will be described below. In addition, the differential amplifier AMP achieves the amplifying operation without being affected by the change in temperature, the change in power source voltage, etc. on the whole since the effects of the change in temperature, the change in power source voltage, etc. on the voltage signals of the non-inverting input terminal + and the inverting input terminal − are canceled by each other.

The comparator COM comprises an operational amplifier, and the voltage (the control voltage) according to the voltage VA produced across the current-detecting resistor R0, i.e., the output voltage VB of the differential amplifier AMP is applied to the inverting input terminal −, and the reference voltage Vf set by resistance voltage dividers (resistors R2 and R3) is applied to the non-inverting input terminal +, respectively. The reference voltage Vf is the voltage corresponding to the allowable maximum value of the preset current, for example, the allowable maximum value If of the excess current when the motor is started or forcibly stopped by the external force or the like.

The comparator COM compares the control voltage VB from the current-detecting resistor R0 side with the reference voltage Vf when the motor is driven, and outputs the L (Low) level signal for the period in which the control voltage VB exceeds the reference voltage Vf. When the output signal VC of the comparator COM is on the L level, a transistor Q1 is turned on, a transistor Q2 is accordingly turned on, and thus diodes D1 and D2 are forward-biased to realize the conduction.

Each gate G of the FETs T1 and T2 is grounded through the diodes D1 and D2 and between the collector-emitter of the transistor Q2. Thus, the FETs T1 and T2 are turned off irrespective of the state of the control signal from the drive circuit DRV, and the electrification to the field coils L1 and L2 is shut off. This means that the current is limited when the current in the field coils L1 and L2 exceeds the allowable maximum value If of the excess current when the motor is started or forcibly stopped by the external force or the like.

The OFF state of the FETs T1 and T2 is continued so long as the control voltage VB exceeds the reference voltage Vf, and the current is limited when the motor is started, or forcibly stopped by the external force.

When the control voltage VB is below the reference voltage Vf, the output signal VC of the comparator COM is on the H (High) level, the transistors Q1 and Q2 are turned off, the diodes D1 and D2 are reverse-biased to realize no conduction. Each gate G of the FETs T1 and T2 is released from the grounded state, and the FETs T1 and T2 are controlled by the signal from the drive circuit DRV. This means that the rotation is returned to the normal one.

In the above embodiment, the control voltage VB to the comparator COM is obtained by amplifying the voltage VA produced across the current-detecting resistor R0 by the differential amplifier AMP and can be set to be a large value without limiting the current in the field coils L1 and L2, i.e., without increasing the current-detecting resistor R0.

Figure 4:
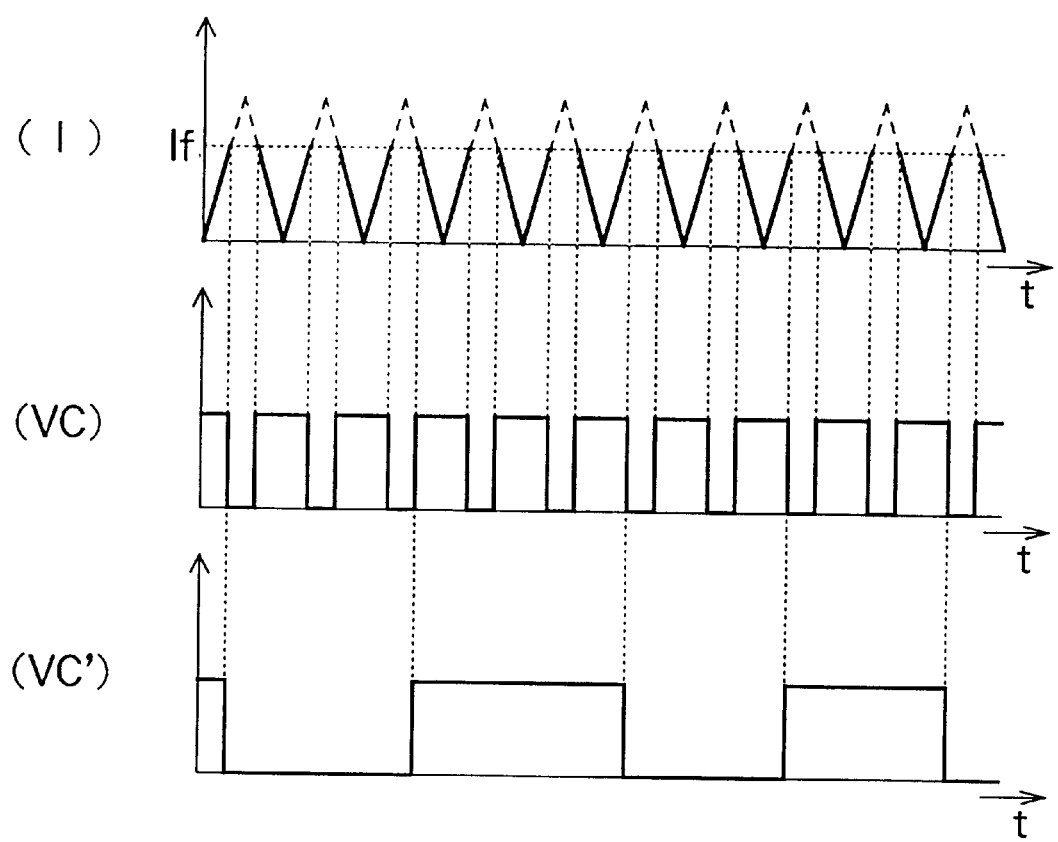
FIG. 4 is a signal waveform chart explaining the operation of the current limiting circuit.

As a result, the reference voltage Vf can be set to be a large value, and the comparison of high accuracy can be realized in the comparator COM. As a result, the comparator is less easily affected by various kinds of disturbance factors such as the change in temperature, the change in power source voltage or the noise from the inside and outside a current limiting circuit 31, and the waveform of the output signal VC of the comparator COM is not expressed by the waveform VC' shown in FIG. 4, but the waveform VC shown in FIG. 4 can be maintained.

This means that the ON-OFF frequency of the current when the motor is started, or forcibly stopped by the external force (the starting current, and the current in the forcible stop), etc. is not decreased, i.e., the current can be maintained to be not less than 1 kHz, and any harsh grating noise is not generated when the motor is started, or forcibly stopped by the external force.

In FIG. 1, symbols +V and +Vcc denote a motor drive power supply source and a current limiting circuit driving power supply source, respectively.

Figure 2:
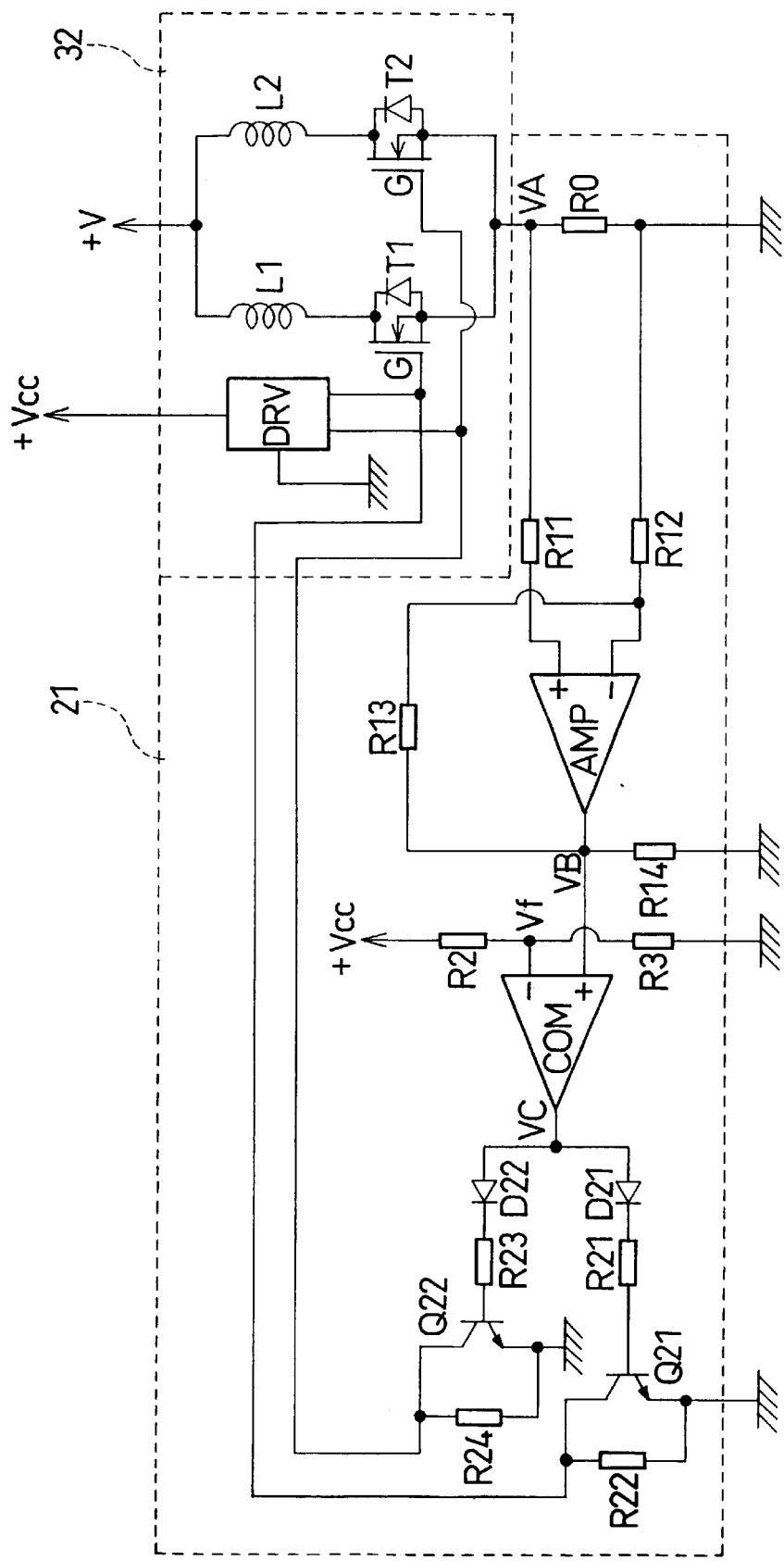
FIG. 2 is a current limiting circuit diagram according to a second embodiment of the present invention.
Figure 3:
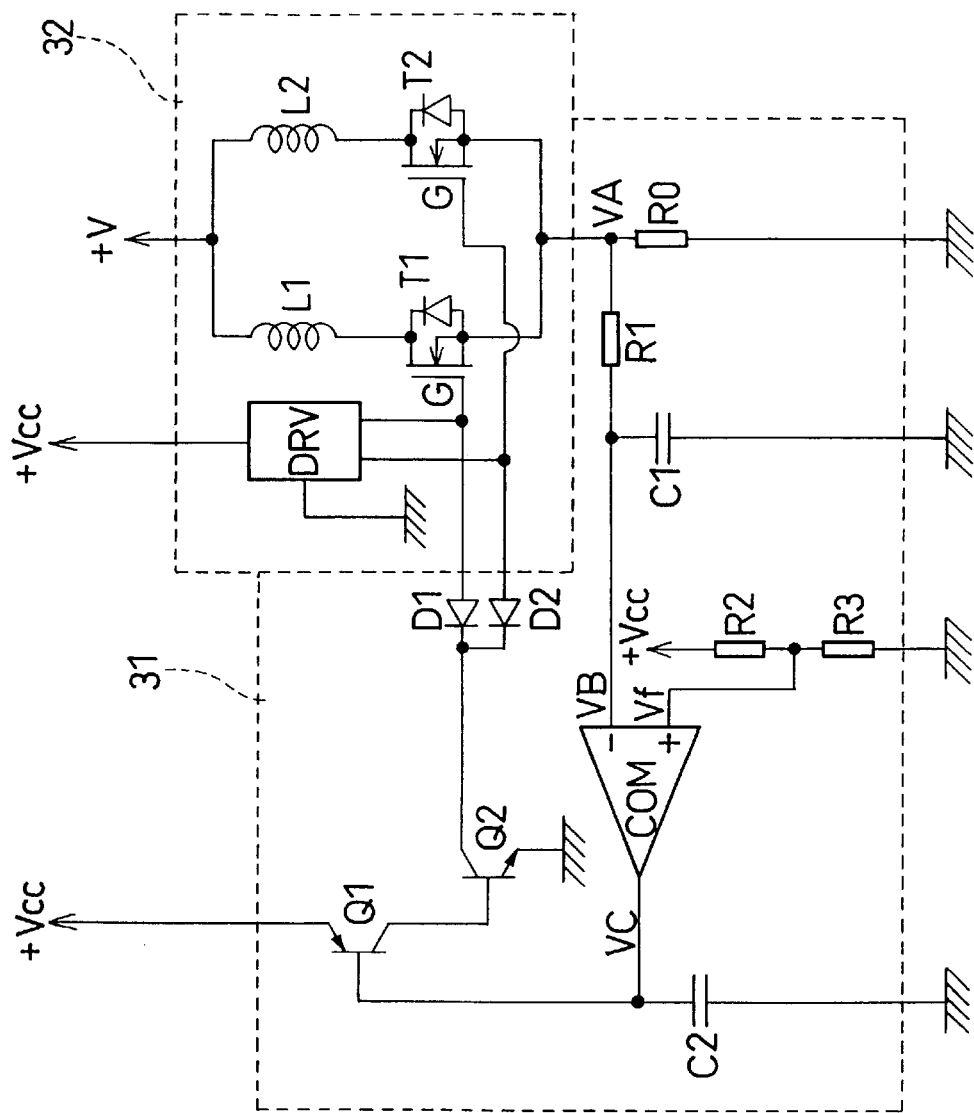
FIG. 3 shows a conventional circuit diagram.

FIG. 2 is a current limiting circuit diagram of the brushless DC fan motor according to a second embodiment of the present invention.

In the figure, numeral 21 denotes a current limiting circuit of the brushless DC fan motor (circuit) 32. The current limiting circuit 21 in the two-phase motor 32 is also shown here similar to that in FIG. 1.

The second embodiment is similar to the above first embodiment except that the voltage signal applied to the inverting input terminal – of the comparator COM comprising the operational amplifier is reverse to the voltage signal applied to the non-inverting input terminal +, and the circuit configuration between the output terminal of the comparator COM and the gates (control input terminals) G of the FETs T1 and T2 is different.

In FIG. 2, parts and components which are identical to or correspond to those in FIG. 1 are represented by the same reference numerals and symbols, a detailed description thereof is omitted, and the above differences are mainly described.

In the second embodiment, the reference voltage Vf set by resistance voltage dividers (resistors R2 and R3) and the voltage (the control voltage) VB according to the voltage VA produced across the current-detecting resistor R0 are applied to the inverting input terminal – of the comparator COM and the non-inverting input terminal +, respectively.

The configuration between the output terminal of the comparator COM and the gates (control input terminals) G of the FETs T1 and T2 comprises diodes D21 and D22, resistors R21 to R24, and switching elements, i.e., transistors Q21 and Q22.

In the diode D21, an anode and a cathode are connected to the output terminal of the comparator COM and a base of the NPN transistor Q21 via the resistor R21, respectively. In the transistor Q21, a collector is grounded via the resistor R22, and connected to the gate G of the FET T1, and an emitter is grounded.

In the diode D22, an anode and a cathode are connected to the output terminal of the comparator COM and a base of the NPN transistor Q22 via the resistor R23, respectively. In the transistor Q22, a collector is grounded via the resistor R24, and connected to the gate G of the FET T2, and an emitter is grounded.

Next, the operation of the second embodiment will be described.

It is similar to the first embodiment that the control voltage VB to the comparator COM is obtained by amplifying the voltage VA produced across the current-detecting resistor R0 by the differential amplifier AMP.

The comparator COM compares the control voltage VB from the current-detecting resistor R0 side with the reference voltage Vf when driving the motor, and outputs the H (High) level signal for the period in which the control voltage VB exceeds the reference voltage Vf.

When the output signal VC of the comparator COM is on the H level, the diodes D21 and D22 are forward-biased to realize the conduction, and the bases of the transistors Q21 and Q22 are set to be on the H level via the resistors R21 and R22, respectively.

Thus, when the ON signal (the control signal on the H level) is given from the drive circuit DRV to each gate G of the FETs T1 and T2, the gate G of the FET T1 or T2 with the ON signal (on the H level) given thereto is grounded via the collector-emitter of the transistor Q21 or Q22. This means that the gate G of the FET T1 or T2 connected in series to the field coil L1 or L2 on the supply side of the current to generate the control voltage VB (the voltage VA) exceeding the reference voltage Vf is grounded.

As a result, the FETs T1 and T2 are turned off irrespective of the state of the control signal from the drive circuit DRV for the period in which the control voltage VB exceeds the reference voltage Vf and shut off the field coils L1 and L2 to be electrified. This means that the current is limited when the current in the field coils L1 and L2 exceeds the allowable maximum value If of the excess current when the motor is started, or forcibly stopped by the external force.

The OFF state of the FETs T1 and T2 is continued so long as the control voltage VB exceeds the reference voltage Vf, and the current is limited when the motor is started, or forcibly stopped by the external force.

When the control voltage VB is below the reference voltage Vf, the output signal VC of the comparator COM is on the L (Low) level, the diodes D21 and D22 are reverse-biased to realize no conduction, and the bases of the transistors Q21 and Q22 are set on the L level, respectively.

As a result, each gate G of the FETs T1 and T2 is released from the grounded state, and the FETs T1 and T2 are controlled by the signal from the drive circuit DRV. In other words, the rotation is returned to be normal.

As described above, also in the second embodiment, the control voltage VB to the comparator COM is obtained by amplifying the voltage VA produced across the current-detecting resistor R0, and can be set to be a large value without increasing the current-detecting resistor R0.

As a result, the reference voltage Vf can be set to be a large value, and the comparison of high accuracy can be realized in the comparator COM, and thus, any harsh grating noise is not generated when the motor is started, or forcibly stopped by the external force similar to the first embodiment.

In particular, the second embodiment includes the transistors Q21 and Q22 which ground the gate G of the FET T1 or T2 connected in series to the field coil L1 or L2 on the supply side of the current to produce the control voltage VB exceeding the reference voltage Vf for the period in which the control voltage VB exceeds the reference voltage Vf, and shut off the electrification to the field coil L1 or L2. As a result, the transistors Q21 and Q22 are individually, i.e., alternately turned ON/turned OFF to the FETs T1 and T2.

Thus, according to the second embodiment, the factors of generating the harsh grating noise can be reduced more than the configuration of a conventional technology or in the above first embodiment in which both the transistors Q1 and Q2 are turned on commonly to the FETs T1 and T2, i.e., continuously so long as the control voltage VB is not less than the reference voltage Vf. In addition, all current limiting functions are not lost when one switch element (the transistor Q21 or Q22, the transistor Q1 or Q2) is failed.

In the above embodiments, the FET, the transistor and the operational amplifier are employed for the switching element, the switch element, and the comparator and the differential amplifier, respectively; but the embodiments are not limited to this example.

Further, the brushless DC fan motor is not limited to the two-phase one.

As described above, in the present invention, the accuracy in comparison in the comparator is improved between the control voltage according to the current in the field coil and the reference voltage according to the current to be limited when the motor is started, or forcibly stopped by the external force by interposing the differential amplifier between the current-detecting resistor of the field coil and the comparator.

As a result, when the motor is started, or forcibly stopped by the external force, the ON-OFF frequency of the current is less than 1 kHz when limiting the current by shutting off the field coil to be electrified for the period in which the control voltage exceeds the reference voltage by the output signal of the comparator, and the harsh grating noise can be prevented.

In addition, the switch element is provided corresponding to the switching element connected in series to the field coil, and the control input terminal of the switching element connected in series to the field coil on the supply side of the current to produce the control voltage exceeding the reference voltage for the period in which the control voltage exceeds the reference voltage is grounded.

In this configuration, the switch element is turned ON/turned OFF individually to a plurality of switching elements, and the factors of generating the harsh grating noise in this configuration can be reduced more than the configuration in which the switch element common to a plurality of switching elements is turned ON/turned OFF, and the harsh grating noise can be further eliminated thereby.

What is claimed is:

1. A current limiting circuit to limit the current running in field coils of a brushless DC fan motor comprising a stator having a plurality of the field coils and a rotor having a permanent magnet in which the rotor is rotated by alternately switching the current running in the field coils and rotating the permanent magnet following the rotating magnetic field formed by the field coils by shutting off the field coils to be electrified for a period in which the control voltage exceeds the reference voltage by the output signal of a comparator which compares the control voltage as the voltage according to the voltage produced across a current-detecting resistor interposed in electrified passages of the field coils with the preset reference voltage comprising:

a differential amplifier which is interposed between the current-detecting resistor and the comparator, amplifies the voltage produced across the current-detecting resistor and applies the voltage to the comparator as the control voltage wherein a comparator output frequency is not less than 1 KHz.

2. A current limiting circuit to limit the current in field coils of a brushless DC fan motor comprising a stator having a plurality of the field coils with each switching element connected in series thereto and a rotor having a permanent magnet in which the rotor is rotated by alternately switching the current in the field coils by turning ON/turning OFF the switching elements and rotating the permanent magnet following the rotating magnetic field formed by the field coils by shutting off the field coils to be electrified for a period in which the control voltage exceeds the reference voltage by the output signal of a comparator which compares the control voltage as the voltage according to the voltage produced across a current-detecting resistor interposed in electrified passages of the field coils with the preset reference voltage comprising:

a differential amplifier which is interposed between the current-detecting resistor and the comparator, amplifies the voltage produced across the current-detecting resistor and applies the voltage to the comparator as the control voltage wherein a comparator output frequency is not less than 1 KHz; and switch elements which are provided corresponding to each of the switching elements, receive the output signal of the comparator and shut off the electrification to the field coils with a control input terminal of the switching elements connected in series to the field coils on the supply side of the current to produce the control voltage exceeding the reference voltage for a period in which the control voltage exceeds the reference voltage.

* * * * *